Patented June 27, 1950

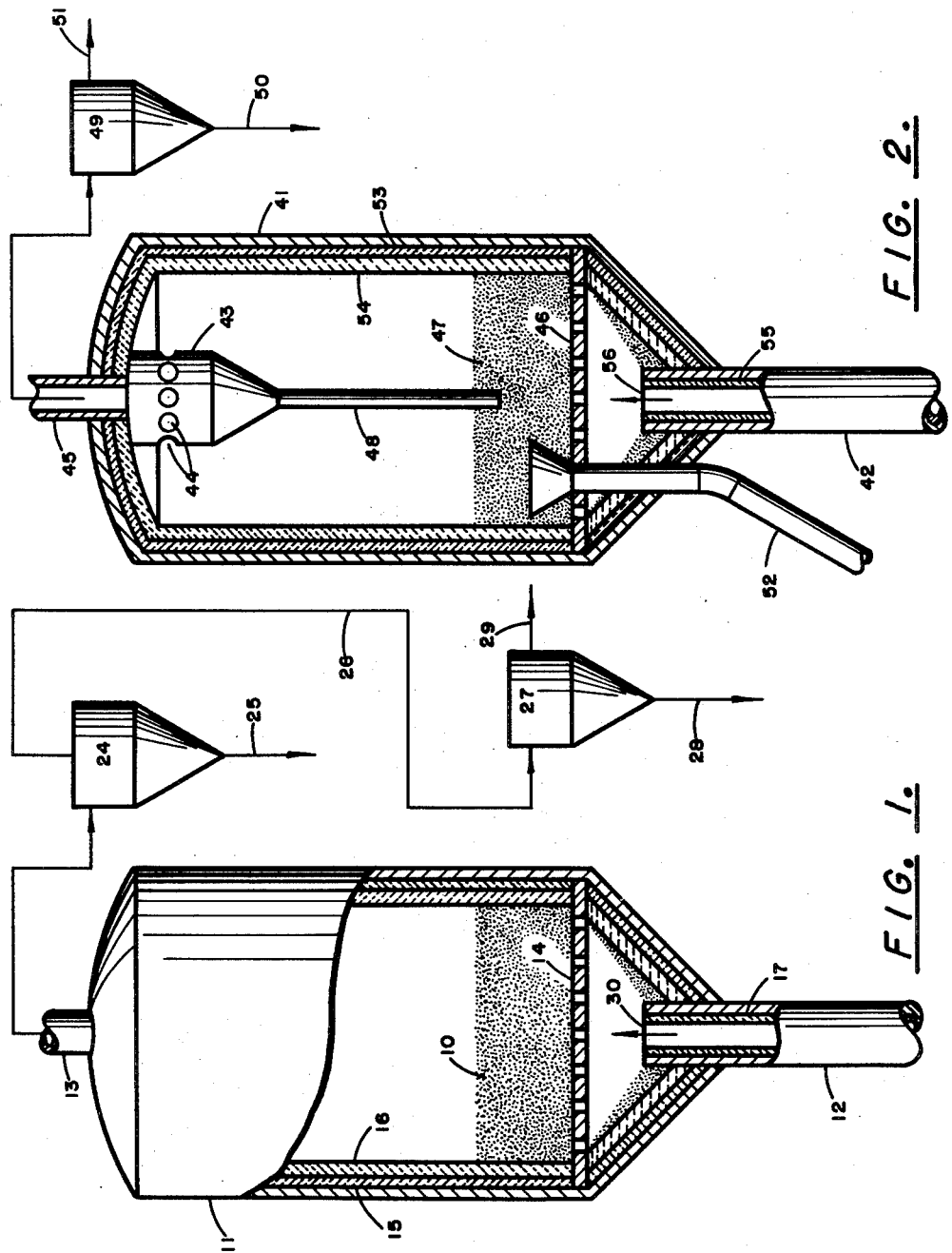

2,513,253

UNITED STATES PATENT OFFICE 2,513,253

APPARATUS FOR HANDLING SUSPENSIONS OF SOLIDS IN GASES

George W. Robinson, Baytown, Tex., assignor to Standard Oil Development Company, a corporation of Delaware Application November 10, 1944, Serial No. 562,895

1 Claim. (Cl. 23—288)

The present invention is directed to apparatus adapted for handling suspensions of finely divided solids in a gasiform vehicle or medium. In its more specific aspects, the present invention is directed to an apparatus for handling suspensions of the character employed when treating organic materials with finely divided catalysts, as when cracking petroleum fractions in the presence of a powdered catalyst.

In the so-called "fluid catalyst" cracking units at present employed in the refining of petroleum fractions, a solid catalyst is employed with the particles finely divided and having an average particle diameter ranging from about 20 to 80 microns. The complete refining unit includes a number of vessels, such as reactor and regenerator vessels, and large quantities of the powdered catalyst are circulated through the unit by forming a suspension of the powdered catalyst with air, steam or hydrocarbon vapor as the carrying medium or vehicle, and blowing the suspension through the closed system. Difficulty has been encountered in handling this suspension, particularly in the regenerators and reactor vessels. Such a vessel is usually quite large with its bottom in the shape of a cone, with the tapering end pointed downwardly and is installed at a substantial height above the surface of the earth. An inlet line is arranged to convey a suspension of solids in a gasiform liquid upwardly and connects into the vessel in the apex of the cone. Within the vessel itself the powdered catalyst is maintained in suspension as a phase of considerably greater density than the stream discharged into the vessel. The velocity of the gasiform suspension agent entering the vessel is reduced at a point immediately adjacent the bottom of the reaction vessel and results in a catalyst phase of greater concentration than the gasiform suspension entering the vessel. Fluctuations in the amount of catalyst of greater concentration, or dense phase catalyst, adjacent the inlet line, results in substantial fluctuations of the pressure in the inlet line with a resultant vibration of substantial magnitude, both in the inlet line and in the vessel led by the inlet line.

The reactor vessels and regenerator units employed in the fluid catalytic cracking art are designed to be operated at relatively high temperatures. For example, the interior temperature of a regenerator unit may be approximately 1175° F. and the interior temperature of the reactor vessel may be 1000° F. It may be desirable that the temperatures of the metal shells of such vessels be no greater than 750° F., and in order to maintain these metal shell temperatures, it is conventional to provide the interior of the vessels with a layer of insulation protected by a layer of tile. For example, the interior wall of the shell may be provided with a 4 inch layer of insulation, and a 3 inch layer of tile.

If the regenerator or reactor vessel is constructed with the bottom in the shape of a cone with the inlet line joined at the apex of the cone, the dropback of the dense phase into the inlet line not only causes substantial fluctuation in the pressure of the inlet line but in addition abrades the thermal insulation placed on the interior wall of the bottom cone and causes frequent failures thereof.

In accordance with the present invention, a system for handling a suspension is provided including a large vessel provided with a conical bottom with a vertical inlet line discharging into the lower end of the vessel and arranged to reduce the amount of dropback of catalyst into the inlet line and to reduce the abrasion and failures of the interior thermal insulation in the vessel.

The device of the present invention may be briefly described as involving a vessel provided with a conically shaped bottom and interior thermal insulation and adapted for use as a reactor or regenerator in a fluid catalyst cracking system wherein the inlet to the vessel is connected to the apex of the cone forming the bottom of the vessel, and wherein a tubular extension projects inwardly above the point of connection of the inlet line with the bottom of the vessel. The arrangement of the present invention reduces the amount of erosion of the thermal lining, allows a layer of material to form above the lining of the vessel to aid in maintaining the metallic shell of the chamber at a desired relatively low temperature, and reduces the dropback of the catalyst into the inlet line as well as the resulting surges in pressure caused by such dropback.

The invention will now be further explained by reference to the drawing in which:

Fig. 1 is an elevation, partly in section, of a catalyst regenerator of the up-flow type, constructed in accordance with the present invention; and Fig. 2 is an elevation, partly in section, of a catalyst regenerator of the down-flow type, constructed in accordance with the present invention.

Turning now specifically to the drawing and first to Fig. 1, a regenerator vessel 11 is provided with an inlet line 12 discharging upwardly into the lower end of the vessel and an outlet line 13 connected to the upper end of the vessel. It will be seen that the body of the vessel is of a cylindrical shape, with its bottom portion in the shape of a frustum of a cone with inlet line 12 connected in the apex of the cone. A perforated partition 14 is arranged transversely in the vessel immediately above the lower conical section in order to produce an increase in velocity of flow of the suspension at this point to aid in maintaining a dense phase of catalyst in the reaction chamber above the partition plate. The dense phase is indicated by shading and is designated by numeral 10.

The interior wall of the vessel is protected with a layer of thermal insulation 15 and the insulation is protected from contact of catalyst in the interior of the vessel by a layer of tile refractory 16. The interior of the inlet pipe is provided with a layer of insulation 17 similar to layer 15 with which the reactor vessel is provided.

A suspension of finely divided catalyst in a gasiform carrier is provided by a suitable means, not shown, and then conducted upwardly by inlet line 12 into reactor vessel 11.

After the catalyst has passed through the vessel, it is removed through outlet line 13 as a suspension and is discharged through a cyclone separator 24 where the major portion of the catalyst is removed through outlet 25 and the suspending gas with the remaining catalyst therein flows from cyclone separator 24 through line 26 and is passed through a Cottrell precipitator 27 where the remainder of the catalyst is precipitated and discharged through line 28 and the waste gases removed through line 29.

In order to reduce the turbulence adjacent the apex of the cone defining the bottom of the vessel, a tubular extension 30 is placed in the throat of the inlet line as it joins the reaction vessel 11 with the extension defining a conduit which releases the suspension of catalyst and gasiform suspending agent within the vessel 11 at a point substantially above the lower end of the apex of the cone of the vessel. The extension 30 reduces the turbulence adjacent the lower wall of the cone and allows dense phase catalyst to collect in the pocket defined by the lower wall of the cone and extension 30. Extension 30, accordingly, not only reduces the turbulence with its resultant abrasion of the thermal insulation in the lower end of the cone, but, in addition, defines a pocket within which a substantial layer of catalyst may deposit which supplements the action of the thermal insulation in reducing the temperatures of the metal shell of vessel 11 in the conical bottom portion thereof.

Another embodiment of the present invention is shown in Fig. 2. In this figure, the apparatus shown is that adapted for regenerating catalyst and is designated as a downflow catalyst regenerator unit. The regeneration is conducted within a shell 41, which is similar in shape to shell 11 of Fig. 1, with the body of the shell of a general cylindrical shape and its lower end in the shape of a cone. An inlet line 42 discharges into the lower end of the cone. The removal of the larger portion of solids from the gaseous suspending agent is accomplished by placing a cyclone 43 in the upper portion of shell 41, with inlet ports 44 leading into the cyclone and an outlet line 45 for withdrawing gases, having a small portion of the finely divided solid remaining therein. Shell 41 is provided with a transverse perforated plate 46 arranged in the lower portion of the tower immediately above the conical bottom section and serves to maintain the dense phase of the suspension above this point during normal conditions of operation. The dense phase is indicated by shading and designated by numeral 47. The major portion of the finely divided solid carried upwardly into cyclone separator 41 is dropped back through a sealed dip leg 48 into the dense phase 47. The outlet line 45 discharges into a Cottrell precipitator 49, where the remainder of the solid is separated from the gases and removed via line 50, while the gases are discharged through outlet 51. Regenerated catalyst is withdrawn from the portion of the tower in which the dense phase accumulates by discharge line 52, which pierces plate 46 and extends downwardly through the wall of vessel 41. The regenerated powdered catalyst may be removed via line 52 without the withdrawal of appreciable amounts of gases therewith.

Metal shell 41 is protected by an interior layer of thermal insulation 53 and a layer of tile 54 laid on the insulation. A layer of insulation 55 is provided on the interior surface of inlet 42.

An extension 56 is provided at the junction of inlet line 42 with shell 41, and extends upwardly within the shell to define a pocket between the lower conical portion of the shell 41 and extension 56. This pocket defines a quiescent section and reduces the abrasion of the lining of the vessel adjacent the point of inlet and, in addition, provides a zone within which a layer of catalyst is deposited to supplement the effect of the insulation and tile in maintaining the temperatures of the shell substantially lower than the interior temperatures of the vessel.

As a specific example illustrating the present invention, a downflow catalyst regenerator unit, similar to that of Fig. 2, is constructed with a diameter of the regenerator vessel of approximately 42 feet and with an inlet line discharging into the lower end thereof with a diameter of 90 inches. Suspension is caused to flow into the vessel at a rate of 55 tons of powdered catalyst suspended in 50,000 cubic feet of air per minute. The interior temperature of the regenerator vessel is maintained at 1175° F. In order to maintain the shell temperatures at no greater than about 750° F., a 4 inch layer of insulation is placed on the interior wall of the shell and a 3 inch layer of a tile refractory is placed over the insulation to protect it. The lining in the shell adjacent the inlet line into the vessel is protected from erosion by the arrangement of an extension upwardly from the inlet line into the vessel, said extension having a diameter of 90 inches as does the inlet line and extending 36 inches upwardly in the vessel above the junction of the inlet line with the bottom of the vessel. This arrangement forms a pocket in which catalyst accumulates and allows the vessel to be operated over a period of a number of months without failure of the thermal insulation in the conical portion of the vessel adjacent the inlet line.

Having fully described the present invention, what I desire to claim is:

In a system adapted for handling at high temperatures a finely divided solid suspended in a gasiform medium, a reaction vessel, including an upright cylindrical section and a lower conical section defining an inlet opening at its apex secured to the lower end of the cylindrical section at the base of the cone, a perforated partition arranged transversely in the cylindrical section of the reaction vessel adjacent the juncture of said cylindrical section with said conical section, a single vertical conduit fluidly connected with the opening in said conical section and having the circumference of its upper end joined to the opening in the apex of said conical section, a lining of thermal insulation on the interior surface of said vertical conduit, a lining of thermal insulation on the interior surface of said conical section, a tubular extension of said conduit projecting from the line of junction of said conduit with the conical section of said vessel upwardly into said vessel to a height no greater than the conical section of said vessel but at least to a height greater than the thickness of said thermal insulation on the interior of the vessel at said line of junction, said tubular extension terminating a sufficient distance below the perforated partition to permit finely divided suspended solid to flow freely through said tubular extension into said reaction vessel.

GEORGE W. ROBINSON.

REFERENCES CITED

The following references are of record in the file of this patent:

UNITED STATES PATENTS

| Number | Name | Date |
| --- | --- | --- |
| 2,347,682 | Gunness | May 2, 1944 |
| 2,378,792 | Roach | June 19, 1945 |
| 2,394,680 | Gerhold et al. | Feb. 12, 1946 |
| 2,430,443 | Becker | Nov. 11, 1947 |